US009444246B2

United States Patent
Nakamura et al.

(10) Patent No.: US 9,444,246 B2
(45) Date of Patent: Sep. 13, 2016

(54) POWER CONVERTER WITH SWITCHING ELEMENT

(71) Applicants: DENSO CORPORATION, Kariya, Aichi-pref. (JP); NIPPON SOKEN, INC., Nishio, Aichi-pref. (JP)

(72) Inventors: Kimikazu Nakamura, Handa (JP); Yuji Hayashi, Kasugai (JP)

(73) Assignees: DENSO CORPORATION, Kariya (JP); NIPPON SOKEN, INC., Nishio (JP)

(*) Notice: Subject to any disclaimer, the term of this patent is extended or adjusted under 35 U.S.C. 154(b) by 161 days.

(21) Appl. No.: 14/287,507

(22) Filed: May 27, 2014

(65) Prior Publication Data
US 2014/0347767 A1 Nov. 27, 2014

(30) Foreign Application Priority Data

May 27, 2013 (JP) ................................ 2013-110867

(51) Int. Cl.
| | | |
|---|---|---|
| *H02H 3/20* | (2006.01) | |
| *H02H 7/12* | (2006.01) | |
| *H02M 1/32* | (2007.01) | |
| *H02M 3/155* | (2006.01) | |
| *H02M 3/335* | (2006.01) | |
| *H02M 7/5387* | (2007.01) | |
| *H02H 3/44* | (2006.01) | |
| *G05F 1/573* | (2006.01) | |
| *H02H 9/02* | (2006.01) | |

(52) U.S. Cl.
CPC ............. *H02H 7/1213* (2013.01); *H02M 1/32* (2013.01); *H02M 3/155* (2013.01); *H02M 3/335* (2013.01); *H02M 7/5387* (2013.01); *G05F 1/573* (2013.01); *H02H 3/44* (2013.01); *H02H 9/02* (2013.01)

(58) Field of Classification Search
USPC ...................................... 361/18, 86–87, 91.1
See application file for complete search history.

(56) References Cited

U.S. PATENT DOCUMENTS

| | | | |
|---|---|---|---|
| 2006/0083031 A1* | 4/2006 | Cook, II ................. | H02M 1/32 363/20 |
| 2008/0007190 A1* | 1/2008 | Kunii ...................... | B60L 11/08 318/141 |
| 2010/0073974 A1 | 3/2010 | Zeng et al. | |
| 2011/0310644 A1* | 12/2011 | Ogura ................. | H02M 7/5387 363/55 |

FOREIGN PATENT DOCUMENTS

| | | |
|---|---|---|
| JP | 9-16274 | 1/1997 |
| JP | 2000-341935 | 12/2000 |

(Continued)

OTHER PUBLICATIONS

Office Action (2 pgs.) dated Sep. 10, 2015 issued in corresponding Japanese Application No. 2013-110867 with an at least partial English-language translation (3 pgs.).

*Primary Examiner* — Danny Nguyen
(74) *Attorney, Agent, or Firm* — Nixon & Vanderhye P.C.

(57) ABSTRACT

In a power converter, a driver that drives, according to a control signal, a switching element of a switch circuit for converting input power to output power. The control signal represents how to drive the switching element. A controller outputs the control signal to the driver for controlling the driver. A measuring unit measures a value of input power input to the switch circuit. A protection determining unit determines, based on the measured value of the input power, whether there is a need to protect the power converter. The protection determining unit outputs a stop control signal to at least one of the driver and the controller based on a result of the determination of whether there is a need to protect the power converter. The stop control signal represents whether to forcibly stop drive of the switching element.

12 Claims, 6 Drawing Sheets

(56) References Cited

FOREIGN PATENT DOCUMENTS

| JP | 2005-110374 | 4/2005 |
| JP | 2006-101680 | 4/2006 |
| JP | 2010-75045 | 4/2010 |
| JP | 2010-213559 | 9/2010 |
| JP | 2012-238447 | 12/2012 |

* cited by examiner

POWER CONVERTER WITH SWITCHING ELEMENT

CROSS REFERENCE TO RELATED APPLICATIONS

This application is based on and claims the benefit of priority from Japanese Patent Application 2013-110867 filed on May 27, 2013, the disclosure of which is incorporated in its entirety herein by reference.

TECHNICAL FIELD

The present disclosure relates to power converters for converting input power into output power based on turn-on and turn-off operations of a switching element.

BACKGROUND

DC-DC converters, as an example of power converters, are often used in electronic devices, electronic systems, and the like. In order to improve safety of such DC-DC converters in high-power use, there are known input-output isolation DC-DC converters each having isolation, i.e. electric isolation, between its input and output. Some types of input-output isolation DC-DC converters are designed to be able to use various measurement signals correlated with their operation safety while maintaining an increase of their circuit sizes. One example of these types of input-output isolation DC-DC converters is disclosed in Japanese Patent Application Publication No. 2006-101680, referred to simply as a known Patent Publication.

The input-output isolation DC-DC converter disclosed in the known Patent Publication includes: an input-side circuit for converting an input voltage sent from a DC voltage source via a switching element into an AC voltage using switching elements; an output-side circuit for rectifying the AC voltage to an output voltage using rectifier elements; and a transformer. The transformer is equipped with a magnetic core as a magnetic component for transferring the AC voltage from the input-side circuit to the output-side circuit while electrically isolating the input-side circuit and the output-side circuit. The input-output isolation DC-DC converter also includes a controller for controlling the switching elements of the input-side circuit based on the output voltage fed back from the output-side circuit. The controller is equipped with an input-state monitor. The input-state monitor monitors a level of the input voltage, outputs a pulse signal with a predetermined duty factor based on the monitored level of the input voltage, and changes the duty factor of the pulse signal when determining that there is an abnormality in the input-side circuit. When the controller recognizes the change of the duty factor of the pulse signal, the controller turns off the switching elements.

SUMMARY

The controller disclosed in the known Patent Publication requires some time until the controller recognizes that the duty factor of the pulse signal has been changed to thereby turn off the switching elements. Thus, if an input voltage with a level higher than a predetermined normal voltage range for the input-output isolation DC-DC converter is applied to the input-side circuit, there may be some time until the switching elements were turned off. This may result in the need to use higher-voltage electrical components for the input- and output-side circuits, and/or the need of the magnetic core having a larger size for preventing magnetic saturation.

In view of the circumstances set forth above, one aspect of the present disclosure seeks to provide power converters, which are capable of addressing the issues set forth above.

Specifically, an alternative aspect of the present disclosure aims to provide such power converters, each of which is capable of eliminating the need to use higher-voltage electrical components even if input power with a level higher than a predetermined normal input-power range for the power converter is input to the power converter. If such a power converter according to the alternative aspect of the present disclosure is an input-output isolation power converter, the power converter is also capable of eliminating the need to use a magnetic component of a transformer having a larger size.

According to an exemplary aspect of the present disclosure, there is provided a power converter. The power converter includes a driver that drives, according to a control signal, a switching element of a switch circuit for converting input power to output power. The control signal represents how to drive the switching element. The power converter includes a controller that outputs the control signal to the driver for controlling the driver, a measuring unit that measures a value of the input power input to the switch circuit, and a protection determining unit. The protection determining unit determines, based on the measured value of the input power, whether there is a need to protect the power converter. The protection determining unit outputs a stop control signal to at least one of the driver and the controller based on a result of the determination of whether there is a need to protect the power converter. The stop control signal represents whether to forcible stop drive of the switching element.

This configuration makes it possible for at least one of the driver and the controller to stop drive of the switching element if, for example, it is determined that there is a need to protect the power converter due to, for example, an overvoltage being input as the input power to the switch circuit. Thus, even if an overvoltage is input as the input power to the switch circuit, it is possible to immediately and reliably stop drive of the switching element without the need to use higher-voltage electrical components for the power converter. This therefore results in reduction of the manufacturing cost and/or loss of the power converter. If the switch circuit includes a magnetic component, such as a transformer, a coil, an inductor, or the like, this prevents the magnetic-flux density of the magnetic core of the transformer from excessively increasing, thus eliminating the need of for a magnetic core having a larger size for preventing magnetic saturation.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Embodiments of the present disclosure will be described hereinafter with reference to the accompanying drawings. In the embodiments, the phrase "A is/are connected to B" or the similar expressions represents that A is/are electrically connected to B unless otherwise is described. In each of the drawings, there are disclosed elements at least required to describe an allocated part of the present disclosure.

Active-high, which represents a binary digit of 1, or asserted state of a logical condition, by the higher of binary level signals, i.e. voltages, is used in the embodiments. However, active-low, which represents a binary digit of 1, or asserted state of a logical condition, by the lower of two binary level signals, i.e. voltages, can be used in the embodiments. Switching-gate control signals can be simply expressed as control signals.

First Embodiment

Figure 1:
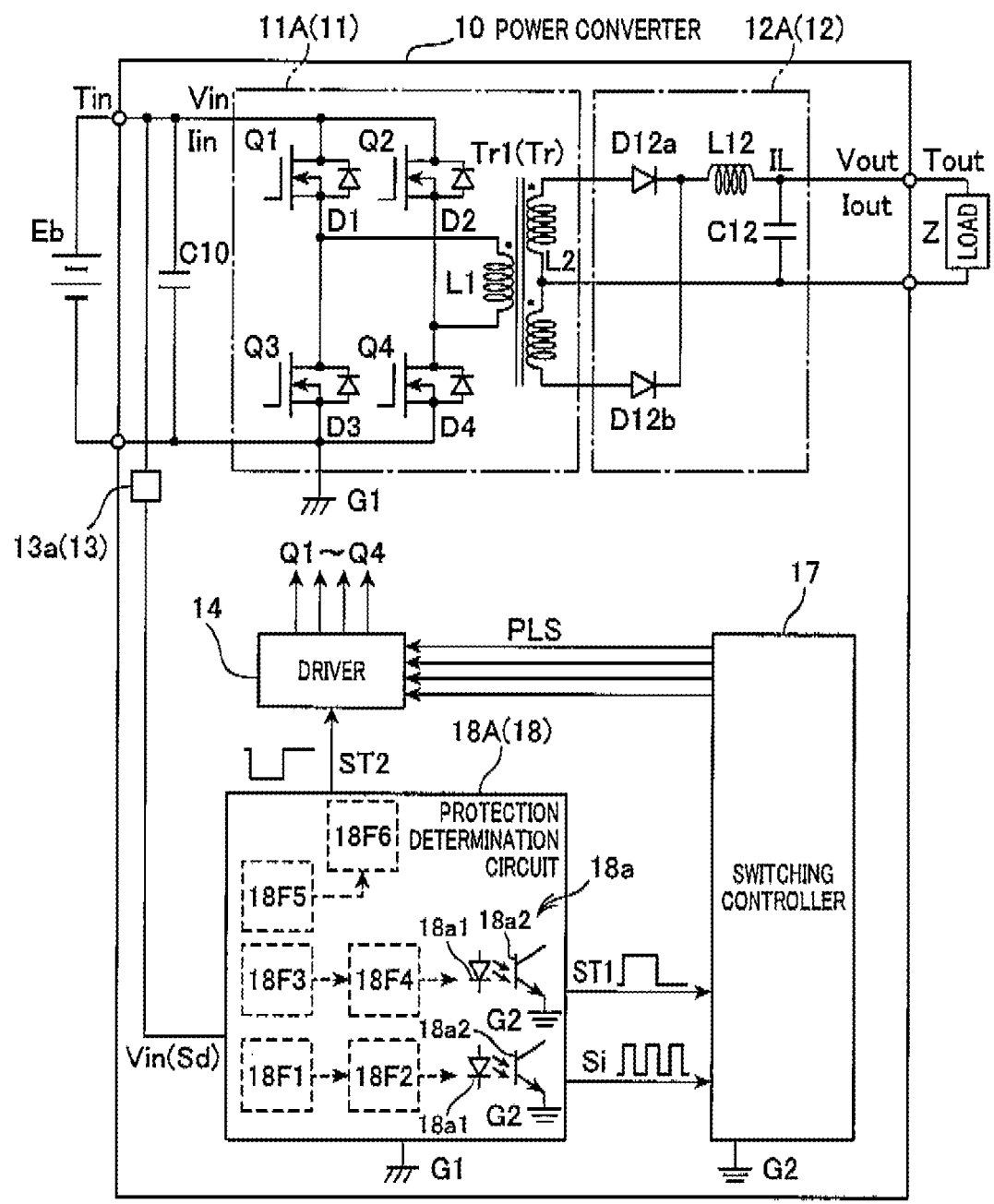
FIG. 1 is a circuit diagram schematically illustrating an example of the overall configuration of a power converter according to a first embodiment of the present disclosure.

Referring to FIG. 1, there is illustrated a power converter 10, in other words, a full-bridge switching power supply, according to a first embodiment of the present disclosure; the switching power supply is an example of power converters according to the present disclosure.

The power converter 10 is operative to convert a variable input DC voltage Vin of, for example, 288 V, as an example of input power, into a required output voltage Vout of, for example, 14 V, as an example of output power. That is, the power converter 10 has a wide dynamic range of voltage conversion.

The power converter 10 has input terminals, i.e. positive and negative input terminals, $T_{IN}$ to which positive and negative terminals of a DC power source Eb are respectively connected. The power converter 10 also has output terminals, i.e. positive and negative output terminals, Tout to which a load Z is connected. As the DC power source Eb, a battery, such as a secondary battery, a fuel cell, or the like, can be used. As the load Z, a DC battery having a predetermined capacity different from that of the DC power source Eb can be used. As the load Z, a rotary machine, such as an electric power generator, a power generator, a motor, or the like, a head lump, or the like can also be used.

The power converter 10 includes a capacitor C10, a switch circuit 11A, a rectifying and smoothing circuit 12A an example of various types of rectifying and smoothing circuits 12, and a voltage sensor 13a. The power converter 10 also includes a driver 14, a switching controller 17, and a protection determination circuit 18A serving as a protection determining unit. These elements of the power converter 10 will be described hereinafter. Note that each element of the power converter 10 is designed to process, unless otherwise is described, at least one of various signals, which are communicated to the power converter 10, in a predetermined form that the element can handle. For example, each element of the power converters 10 is designed to process at least one of these various signals in an analog form or a digital form. In the first embodiment, an input voltage Vin measured by the voltage sensor 13a is for example used as an input signal to the switch circuit 11A. In FIG. 1, reference character Iin represents an input current Iin supplied to the switch circuit 11A.

The capacitor C10 has a first end connected to the positive input terminal Tin, and a second end, which is opposite to the first end, connected to the negative input terminal Tin. That is, the capacitor C10 is connected in parallel to the DC power source Eb, and is operative to smooth the input voltage Vin input thereto from the DC power source Eb.

The switch circuit 11A is comprised of series-connected switching elements Q1 and Q3, series-connected switching elements Q2 and Q4, diodes D1 to D4, and a transformer Tr1 as an example of various types of transformers Tr. For example, as the switching elements Q1 to Q4, IGBTs, FETs (power MOSFETs, JFETs, MEFETs, or the like), another power transistors, GTOs (Gate Turn-Off thyristors), or other similar semiconductor switching elements can be respectively used.

Each of the switching elements Q1 to Q4 has a first terminal, a second terminal, and a conductive path formed therebetween. The first terminal of the switching element Q1 is connected to the positive input terminal Tin via a positive DC input line. The second terminal of the switching element Q1 is connected to the first terminal of the switching element Q3 to constitute the series-connected switching elements Q and Q3. The second terminal of the switching element Q3 is connected to the negative input terminal Tin via a negative DC input line.

Similarly, the first terminal of the switching element Q2 is connected to the positive input terminal IN via the positive DC input line. The second terminal of the switching element Q2 is connected to the first terminal of the switching element Q4 to constitute the series-connected switching elements Q2 and Q4. The second terminal of the switching element Q4 is connected to the negative input terminal Tin via the negative DC input line. For example, if power MOSFETs are used as the switching elements Q1 to Q4, the drain of each of the switching elements Q1 to Q4 serves as the first terminal, and the source serves as the second terminal.

With the configuration, the switching elements Q1 and Q2 will also be referred to as high-side switching elements, and the switching elements Q3 and Q4 will also be referred to as low-side switching elements.

Each of the diodes D1 to D4 is connected between the first end and second end of a corresponding one of the switching elements Q1 to Q4 in antiparallel thereto, and serves as a free-wheel diode.

If power MOSFETs are used as the switching elements Q1 to Q4, intrinsic diodes of the power MOSFETs can be used as the free-wheel diodes, thus eliminating the free-wheel diodes.

The series-connected switching elements Q1 and Q3 and the series-connected switching elements Q2 and Q4 are parallelly connected to each other in full-bridge configuration.

Each of the switching elements Q1 to Q4 has a control terminal connected to the driver 14. If power MOSFETs are used as the switching elements Q1 to Q4, the gate of each of the switching elements Q1 to Q4 serves as the control terminal thereof. As described later, a control signal PLS sent from the driver 14 and input to the control terminal of each of the switching elements Q1 to Q4 opens or closes the conductive path thereof, that is, turns on or off the corresponding switching element.

In the first embodiment, for example, the driver 14 is designed to complementarily turn on the high- and low-side switching elements Q1 and Q3. Similarly, the driver 14 is designed to, for example, complementarily turn on the high- and low-side switching elements Q2 and Q4. In addition, the driver 14 is designed to, for example, alternately turn on a first set of high- and low-side switching elements Q1 and Q4 and a second set of high- and low-side switching elements Q2 and Q3. These operations of the driver 14 permit the switch circuit 11A to serve as an inverter that converts DC power, that is, the DC voltage Vin, input to the switch circuit 11A from the DC power source Eb into AC power, that is, an AC voltage, and applies the AC power to the transformer Tr.

The negative DC input line to which the second terminals of the low-side switching elements Q3 and Q4 are connected is connected to a reference potential G1 as a signal common potential, which is not necessarily zero volts.

The transformer Tr1, which serves as an inductor, is comprised of a primary winding, i.e. primary coil, L1 and a secondary winding, i.e. secondary coil, L2 having a center tap and magnetically coupled to the primary winding L1. The rectifying and smoothing circuit 12 is comprised of a first diode D12a, a second diode 12b, a capacitor C12, and a coil L12. A connecting point between the second end of the switching element Q1 and the first end of the switching element Q3 is connected to one end of the primary winding L1. A connecting point between the second end of the switching element Q2 and the first end of the switching element Q4 is connected to the other end of the primary winding L1.

The secondary winding L2 also has a first end and a second end opposite thereto. The first end of the secondary winding L2 is connected to the anode of the first diode 12a via a high-side input terminal of the rectifying and smoothing circuit 12, and the second end thereof is connected to the anode of the second diode 12b. The center tap of the secondary winding L2 is connected to the negative output terminal Tout via a low-side input terminal of the rectifying and smoothing circuit 12. The center tap divides the secondary winding L2 into a first winding portion and a second winding portion. The turns ratio representing the number of turns of each of the first and second winding portions of the secondary winding L2 to the number of turns of the primary winding L1 is set to a predetermined value.

The transformer Tr1 is operative to convert the AC voltage applied to the primary winding L1, in other words, induced through the primary winding L1, into a different AC voltage induced in the secondary winding L2 while the primary winding L1 is electrically isolated from the secondary so winding L2. The magnitude of the AC voltage induced across the secondary winding L2 is determined based on the turns ratio.

The cathode of the first diode 12a and the cathode of the second diode 12b are commonly connected to one end of the coil L12. The other end of the coil L12 is connected to the positive output terminal Tout. The capacitor C12 is connected between the coil L12 and the load Z to be in parallel to the load Z.

Specifically, the first and second diodes 12a and 12b constitute a full-wave rectifier that full-wave rectifies the AC voltage induced across the secondary winding L2, thus generating a DC voltage. The coil L12 and the capacitor C12 constitute an LC filter configured to smooth the DC voltage output from the full-wave rectifier, thus generating an output voltage Vout across the positive and negative output terminals Tout to be supplied to the load Z.

The voltage sensor 13a is an example of a measuring unit, and is operative to measure, i.e. monitor, the input voltage Vin, and output the input voltage Vin as a measurement signal Sd to the protection determination circuit 18A. The input voltage Vin normally varies in a given wave form, and the output voltage Vout varies depending on the conditions of the load Z and the like. The voltage sensor 13a is operative to measure values of the input voltage Vin at given timings during each of the switching elements Q1 to Q4 being on at a present switching cycle. For example, the given timings include a timing when the input voltage Vi becomes a minimum value, an average value, or a peak value, i.e. a maximum value, of the input voltage Vin during each of the switching elements Q1 to Q4 being on at a present switching cycle.

The driver 14 is connected between the switching circuit 11A and the switching controller 17. The driver 14 is operative to amplify the control signals PLS sent from the switching controller 17, and apply the amplified control signals PLS to the control terminals of the respective switching elements Q1, Q2, Q3, and Q4, thus individually driving on or off the respective switching elements Q1 to Q4. As the control signals PLS for the respective switching elements Q1 to Q4, pulse signals, such as, PWM signals, therefor can be used. Each of the PWM signals for a corresponding one of the switching elements Q1 to Q4 consists of a train of pulses having a variable duty, i.e. a duty factor, for each predetermined switching cycle. The duty factor represents a controllable on-pulse width for each predetermined switching cycle. In other words, the duty factor represents a predetermined ratio, i.e. percentage, of on duration to the total duration of each predetermined switching cycle.

Specially, the driver 14 is operative to determine whether to carryout amplification and application of the control signals PLS to the control terminals of the respective switching elements Q1 to Q4 according to a second stop control signal ST2 sent from the protection determination circuit 18A described later. In the first embodiment, the driver 14 is operative to determine to carry out amplification and application of the control signals PLS to the control terminals of the respective switching elements Q1 to Q4 when the second stop control signal ST2 has a low level L. Otherwise, the driver 14 is operative to determine not to carryout amplification and application of the control signals PLS to the control terminals of the respective switching elements Q1 to Q4 when the second stop control signal ST2 has a high level H.

The protection determination circuit 18A includes isolator elements 18a.

The protection determination circuit 18A also includes:

a first unit 18F1 that generates, based on the measurement signal Sd, i.e. the input voltage Vin, sent from the voltage sensor 13a, state signals Si (i=1, 2, 3, and 4) for the respective switching element Q1 to Q4; and a second unit 18F2 that determines, based on the input voltage Vin, whether to normally transfer the state signal Si to the switching controller 17.

The protection determination circuit 18A includes:

a third unit 18F3 that determines, based on the measurement signal Sd, i.e. the input voltage Vin, sent from the voltage sensor 13a, whether to set a level of a first stop control signal ST1 for the switching elements Q1 to Q4 to one of the high level H and the low level L; and a fourth unit 18F4 that transfers the first stop control signal ST1 with a selected one of the high level H and the low level L to the switching controller 17.

The protection determination circuit 18A includes:

a fifth unit 18F5 that determines, based on the measurement signal Sd, i.e. the input voltage Vin, sent from the voltage sensor 13a, whether to set a level of a second stop control signal ST2 for the switching elements Q1 to Q4 to one of the high level H and the low level L; and a sixth unit 18F6 that transfers the second stop control signal ST2 with a selected one of the high level H and the low level L to the driver 14.

In the first embodiment, as the state signals Si for the respective switching elements Q1 to Q4, pulse signals are used. At least one of the first and second stop control signals ST1 and ST2 can be transferred from the protection determination circuit 18A to a corresponding one of the switching controller 17 and the driver 14. Like the second stop control signal ST2, high and low levels H and L can be used as the first stop control signal ST1. As each of the first and second stop control signals ST1 and ST2, different levels of analog or digital signals can be used. The protection determination circuit 18A is connected to the reference potential G1.

As the state signal Si for each switching element Qi (i=1, 2, 3, and 4), a pulse signal having a variable duty with a constant frequency, i.e. a duty factor with a constant frequency, for each predetermined switching cycle can be used. The duty cycle of the state signal Si for a switching element Qi (i=1, 2, 3, or 4) varies depending on a measured value of the input voltage Vin.

Figure 2:
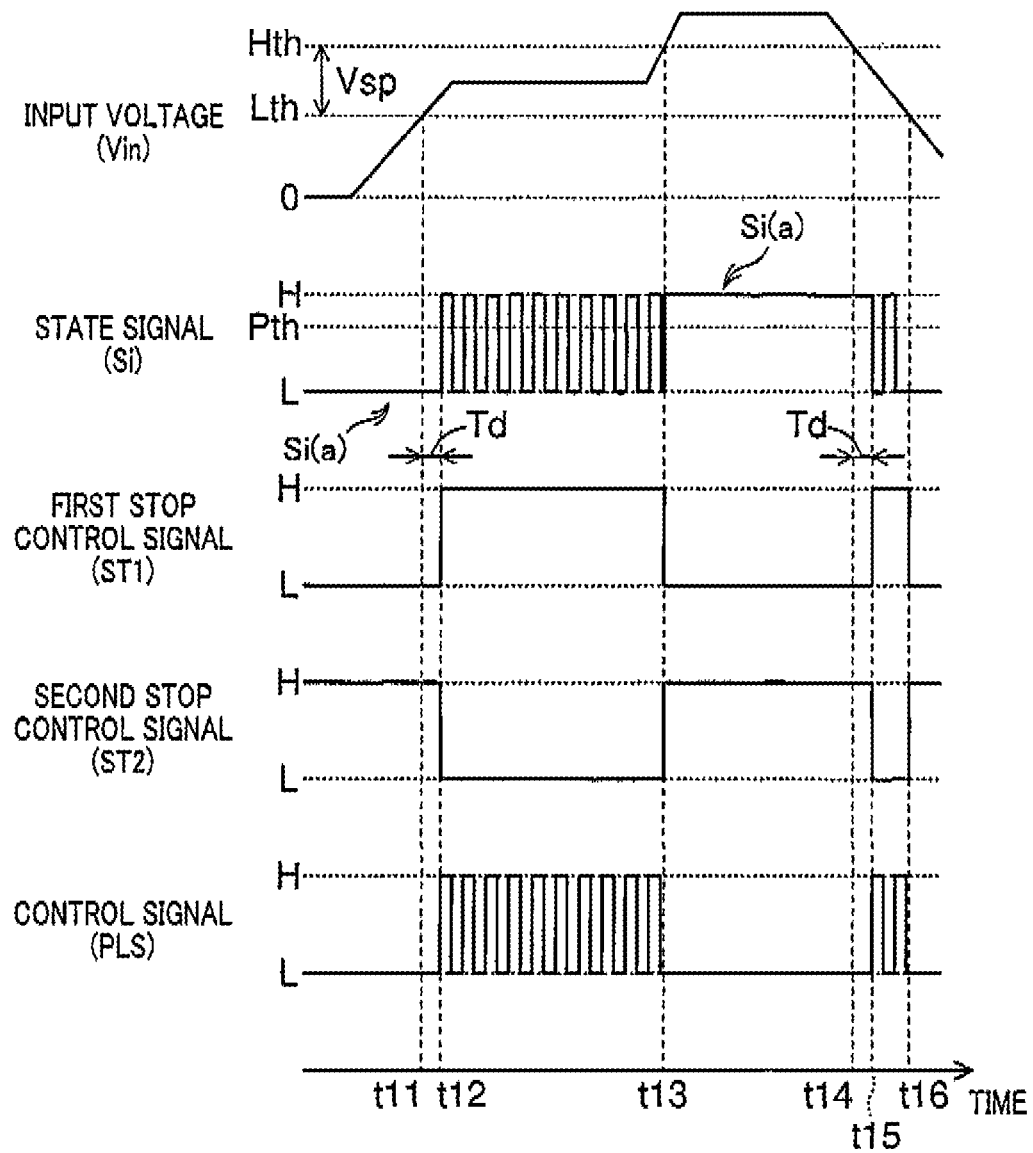
FIG. 2 is a timing chart schematically illustrating an example of how a protection determination circuit and a switching controller operate in a first control mode according to the first embodiment.
Figure 3:
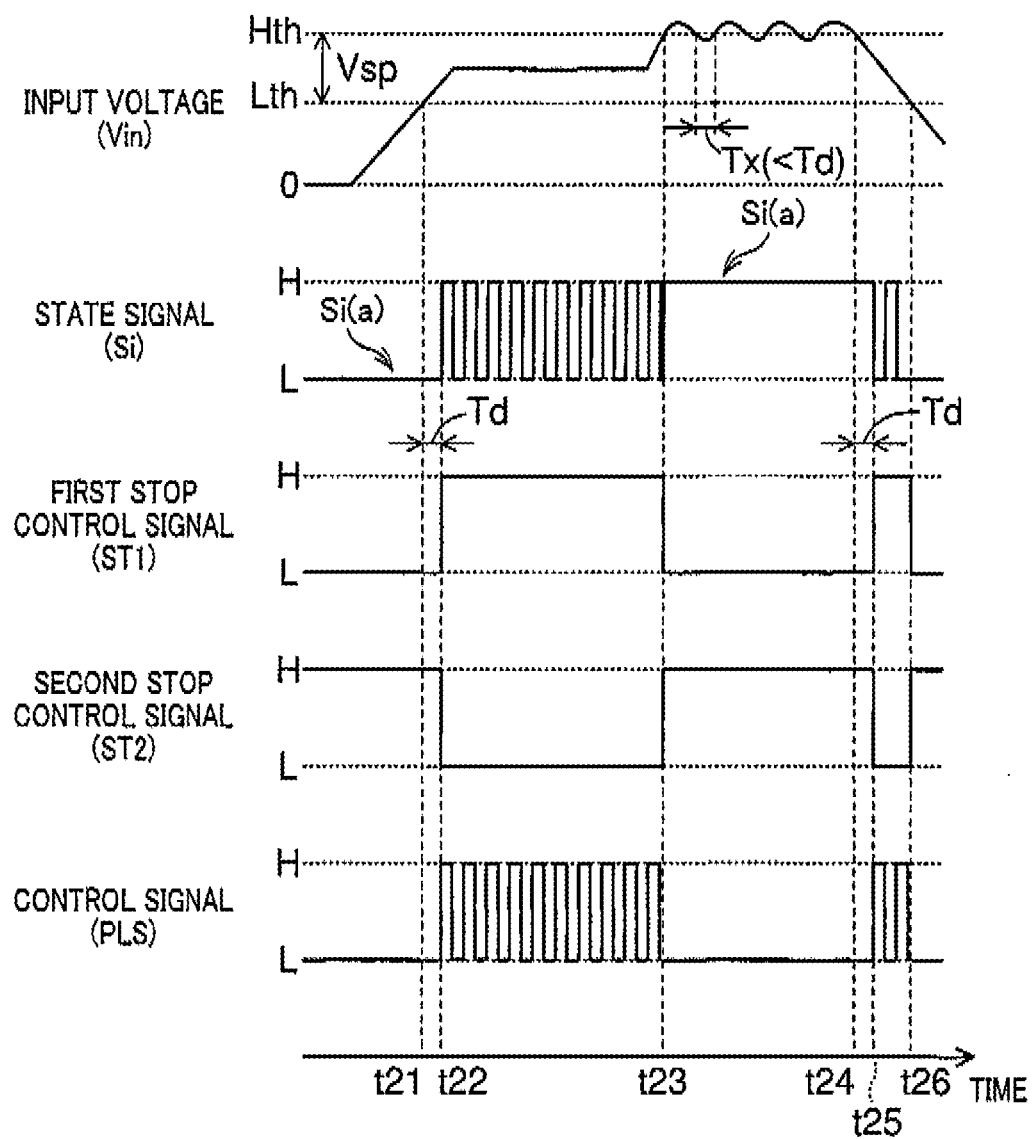
FIG. 3 is a timing chart schematically illustrating an example of how the protection determination circuit and switching controller operate in a second control mode according to the first embodiment.

For example, as illustrated in each of FIGS. 2 and 3, the second unit 18F2 determines whether.

the input voltage Vin has changed to be within a normal voltage range Vsp from outside thereof; and whether the input voltage Vin within the normal voltage range Vsp has been maintained for a preset period Td of time or longer. Note that the normal voltage range Vsp is defined within a low potential threshold level Lth to a high potential threshold level Hth as illustrated in each of FIGS. 2 and 3.

Unless the input voltage Vin within the normal voltage range Vsp has been maintained for the time period Td or longer, that is, the determination by the second unit 18F2 is NO, the second unit 18F2 does not output the state signal Si for each switching element to the switching controller 17 in a normal state, but outputs the state signal Si whose level is forcibly maintained at the constant low level L or the constant high level H as an abnormal state signal Si(a).

Otherwise, upon determination that the input voltage Vin within the normal voltage range Vsp has been maintained for the time period Td or higher, that is, the determination by the second unit F2 is YES, the second unit 18F2 outputs the state signals Si to the switching controller 17. The time period Td serves as a time period required to determine whether the input voltage Vin is stable, and therefore, the time period Td can be set to a suitable time period based on the rating and/or the circuit structure of the power converter 10.

Particularly, the second unit 18F2 determines to output the constant low-level signal having maintained the low level L when the input voltage Vin is lower than the normal voltage range Vsp, i.e. Vin<Lth. In addition, the second unit 18F2 determines to output the constant high-level signal having maintained the high level H when the input voltage Vin is higher than the normal voltage range Vsp, i.e. Vin>Hth.

Similarly, the third unit 18F3 determines to set the level of the first stop control signal ST1 to the high level H when the input voltage Vin within the normal voltage range Vsp has been maintained for the preset period Td of time or longer. The third unit 18F3 sets the level of the first stop control signal ST1 to the low level L when the input voltage Vin is out of the normal voltage range Vsp.

The fifth unit 18F5 determines to set the level of the second stop control signal ST2 to the low level L when the input voltage Vin within the normal voltage range Vsp has been maintained for the preset period Td of time or longer, and determines the level of the second stop control signal ST2 to the high level H when the input voltage Vin is out of the normal voltage range Vsp.

The isolator elements 18a are operative to electrically isolate input signals including the measurement signal Sd, i.e. the input voltage Vin, from output signals including the state signals Si, the first stop control signal ST1, and the second stop control signal ST2. As the isolator elements 18a, given elements having a function of electrically isolating the input signals from the output signals can be used. For example, photo couplers, magnetic-coupling elements, such as inductors, isolation amplifiers, resistors, capacitive elements, such as capacitors can be used as the isolated elements; as the inductors, coils or transformers can be used.

In the first embodiment, as the isolator elements 18a, photocouplers can be used. A photocoupler includes a light emitting element 18a1, such as a photodiode, and a light receiving element 18a2, such as a phototransistor. For example, the light emitting element 18a1 is connected to the voltage sensor 13a, and operative to emit light depending on the input voltage Vin. For example, the light receiving element 18a2 has an output terminal connected to the switching controller 17. The light receiving element 18a2 is also operative to:

receive the light emitted from the light emitting element 18a1; and output an electric signal depending on the emitted light, i.e. the input voltage Vin, to the switching controller 17 as one of the state signal Si and the first stop control signal ST1 for each of the switching elements Q1 to Q4.

The light receiving element 18a2 is connected to a reference potential G2 different from the reference potential G1. When a phototransistor is used as the light receiving element 18a2, the emitter of the phototransistor is connected to the reference potential G2. The reference potential G2 is used as a signal common potential, which is not necessarily zero volts. The reference potential G1 is normally set to be higher than the reference potential G2. The light receiving element 18a2 can be connected to the reference potential G1 via a protection resistor when it can transfer a corresponding one of the normal state signal Si and the first stop control signal ST1 for each of the switching elements Q1 to Q4 to the switching controller 17.

The switching controller 17 is operative to perform control of drive of each of the switching elements Q1 to Q4 such that an actual value, i.e. an actually measured value, of an input/output parameter input to or output from the power converter 10 matches with a target value, i.e. a reference value, of the corresponding input/output parameter. Specifically, the switching controller 17 is operative to individually output the control signals PLS to the control terminals of the respective switching elements Q1 to Q4 based on the actual value of the input/output parameter such that the actual value of the input/output parameter matches with the target value thereof.

In the first embodiment, the switching controller 17 uses the state signal Si for each of the switching elements Q1 to Q4 as the input/output parameter. That is, the switching controller 17 individually outputs the control signal PLS to the control terminal of each of the switching elements Q1 to Q4 based on the actual value of the state signal Si for a corresponding one of the switching elements Q1 to Q4 such that the actual value of the state signal Si matches with the target value thereof. Thus, the switching controller 17 is operative to preferably start outputting the control signal PLS to the control terminal of each of the switching elements Q1 to Q4 after it is determined that the input voltage Vin within the normal voltage range Vsp has been maintained for the time period Td or longer.

The switching controller 17 can use the output voltage Vout of the power converter 10, and/or an output current Iout thereof as the input/output parameter. That is, the switching controller 17 individually outputs the control signal PLS to the control terminal of each of the switching elements Q1 to Q4 based on the actual value of the output voltage Vout and/or the output current Iout such that the actual value of the output voltage Vout and/or the output current Iout matches with the target value thereof. The switching controller 17 is connected to the reference potential G2.

In addition, the switching controller 17 is operative to determine whether to enable output of the control signals PLS to the control terminals of the respective switching elements Q1, Q2, Q3, and Q4 according to the first protection signal S1. Specifically, the switching controller 17 is operative to determine to enable output of the control signals PLS to the control terminals of the respective switching elements Q1, Q2, Q3, and Q4 when the first protection signal S1 has the high level H, and disable output thereof to the control terminals of the respective switching elements Q1, Q2, Q3, and Q4 when the first protection signal S1 has the low level L.

Note that the switching controller 17 can be designed as a programmed logic unit, a hardwired logic unit, or the combination of hardwired-logic and programmed-logic hybrid units.

In addition, note that the target value of an input/output parameter input to or output from the power converter 10 can be for example stored in a storage medium, or can be set based on a voltage value and/or a current value. The target value of an input/output parameter input to or output from the power converter 10 can be for example supplied from an external unit, such as an external ECU or an external computer, or can be set depending on the type and/or the rating of the load Z.

Next, examples of how the protection determination circuit 18A and the switching controller 17 control the switching elements Q1 to Q4 via the driver 14 according to the input voltage Vin measured by the voltage sensor 13a will be described hereinafter with reference to FIGS. 2 and 3. As described above, the first stop control signal ST1 is maintained at the high level H and the second stop control signal ST2 is maintained at the low level L while the input voltage Vin is within the normal voltage range Vsp, in other words, there is a normal input state to the power converter 10. Otherwise, the first stop control signal ST1 is maintained at the low level L and the second stop control signal ST2 is maintained at the high level H while the input voltage Vin is out of the normal voltage range Vsp, in other words, there is an abnormal input state to the power converter 10.

FIG. 2 schematically illustrates a first control mode in which the protection determination circuit 18A and the switching controller 17 operate. The protection determination circuit 18A and the switching controller 17 operate in the first control mode when the input voltage Vin changes between a first state in which it is lower than the low potential threshold level Lth and a second state in which it is higher than the high potential threshold level Hth.

On or before time t11 at which the input voltage Vin reaches the low potential threshold level Lth (current time t≤t11), the state signal Si whose level is forcibly fixed to the low level L for each of the switching elements Q1 to Q4 is output as the abnormal state signal Si(a) by the first and second units 18F1 and 18F2. On or before the time t11, the first stop control signal ST1 is maintained at the low level L by the third and fourth units 18F3 and 18F4, and the second stop control signal ST2 is maintained at the high level H by the fifth and sixth units 18F5 and 18F6.

Because the state signal Si is forcibly maintained at the low level L and the first stop control signal ST1 is maintained at the low level L, no control signals PLS are output from the switching controller 17 to the driver 14. Thus, no amplified control signals PLS are output from the driver 14 to the control terminals of the respective switching elements Q1 to Q4 (see current time t≤t11). In addition, because the second stop control signal ST2 is maintained at the high level H, the switching elements Q1 to Q4 being not driven. The state in which no control signals PLS are output from the switching controller 17 to the driver 14 is continued from the time t11 at which the input voltage Vin reaches the low potential threshold level Lth up to time t12 at which the time period Td has elapsed since the time t11 (see current time t=t12). In other words, the state signal Si is forcibly maintained at the low level L as the abnormal state signal Si(a), the first stop control signal ST1 is maintained as the low level L, and the second stop control signal ST2 is maintained at the high level H up to the time t12.

At the time t12, the input voltage Vin is within the normal voltage range Vsp. At the time t12, the first stop control signal ST1 is changed from the low level L to the high level H by the third and fourth units 18F3 and 18F4, and the second stop control signal ST2 is changed from the high level to the low level by the fifth and sixth units 18F5 and 18F6.

That is, on or after the time t12 (the current time t≥t12), the input voltage Vin changes within the normal voltage range Vsp while the first stop control signal ST1 is maintained at the high level H and the second stop control signal ST2 is maintained at the low level. Thus, the state signal Si for each of the switching elements Q1 to Q4 is output by the first and second units 18F1 and 18F2 to the switching controller 17; the duty factor of the state signal Si for each of the switching elements Q1 to Q4 individually changes depending on the input voltage Vin. In accordance with the state signal Si for each of the switching elements Q1 to Q4, the switching controller 17 outputs, to the driver 14, the control signal PLS for each of the switching elements Q1 to Q4, which corresponds to the state signal Si for a corresponding one of the switching elements Q1 to Q4 (current time t≥t12).

Thus, because the second stop control signal ST2 is maintained at the low level, amplified control signals PLS are output from the driver 14 to the control terminals of the respective switching elements Q1 to Q4 (see current time t≥t12). This results in the switching elements Q1 to Q4 being individually turned on and off according to the corresponding amplified control signals PLS. The state in which the control signals PLS are output from the switching controller 17 to the driver 14 is continued from the time t12 up to time t13 at which the input voltage Vin becomes out of the normal voltage range Vsp.

That is, at the time t13 (current time t=t13), the input voltage Vin becomes to exceed the high potential threshold level Hth so that it is out of the normal voltage range Vsp. For this reason, the state signal Si whose level is forcibly maintained at the high level H for each of the switching elements Q1 to Q4 is output as the abnormal state signal Si(a) by the first and second units 18F1 and 18F2 to the switching controller 17. At the time t13, the first stop control signal ST1 is changed from the high level H to the low level L by the third and fourth units 18F3 and 18F4, and the second stop control signal ST2 is changed from the low level L to the high level H by the fifth and sixth units 18F5 and 18F6.

Because the state signal Si is forcibly fixed to the high level H and the first stop control signal ST1 is maintained at the low level L, no control signals PLS are output from the switching controller 17 to the driver 14. In addition, the second stop control signal ST2 is maintained at the high level H. This results in no amplified control signals PLS being output from the driver 14 to the control terminals of the respective switching elements Q1 to Q4 (see current time t=t13). The state in which no amplified control signals PLS are output from the driver 14 to the respective switching elements Q1 to Q4 is continued from the time t13 at which the input voltage Vin exceeds the high potential threshold level Hth up to time t14. At the time t14, the input voltage Vin returns to be within the normal voltage range Vsp again (see current time t=t14).

That is, at the time t14, the input voltage Vin returns to be within the normal voltage range Vsp again. At that time, until the time period Td has elapsed since the time t14, the state signal Si is forcibly maintained at the high level H, the first stop control signal ST1 is maintained at the low level L, and the second stop control signal ST2 is maintained at the high level H (see the time interval from the time t14 to time t15).

After the time period Td has elapsed since the time t14 (see current time t=t15), the input voltage Vin is within the normal voltage range Vsp. At the current time t=t15, the first stop control signal ST1 is changed from the low level L to the high level H by the third and fourth units 18F3 and 18F4, and the second stop control signal ST2 is changed from the high level to the low level by the fifth and sixth units 18F5 and 18F6.

Thus, the state signal Si for each of the switching elements Q1 to Q4 is output by the first and second units 18F1 and 18F2 to the switching controller 17. In addition, the control signal PLS for each of the switching elements Q1 to Q4 that corresponds to the state signal Si for a corresponding one of the switching elements Q1 to Q4 is output from the switching controller 17 to the driver 14. Thus, because the second stop control signal ST2 is maintained at the low level L, amplified control signals PLS are output from the driver 14 to the control terminals of the respective switching elements Q1 to Q4 (see current time t≥t15). This results in the switching elements Q1 to Q4 being individually driven, i.e. turned on and off, according to the corresponding amplified control signals PLS. The state in which the control signals PLS are output from the switching controller 17 to the driver 14 is continued from the time t15 up to time t16 at which the input voltage Vin becomes out of the normal voltage range Vsp.

That is, at the time t16 (current time t=t16), the input voltage Vin becomes to fall below the low potential threshold level Lth so that it is out of the normal voltage range Vsp. For this reason, the state signal Si whose level is forcibly fixed to the low level L for each of the switching elements Q1 to Q4 is output by the first and second units 18F1 and 18F2 to the switching controller 17. At the time t16, the first stop control signal ST1 is changed from the high level H to the low level L by the third and fourth units 18F3 and 18F4, and the second stop control signal ST2 is changed from the low level L to the high level H by the fifth and sixth units 18P5 and 18F6.

Because the state signal Si is forcibly fixed to the low level L and the first stop control signal ST1 is maintained at the low level L, no control signals PLS are output from the switching controller 17 to the driver 14. In addition, the second stop control signal ST2 is maintained at the high level H. This results in no amplified control signals PLS being output from the driver 14 to the control terminals of the respective switching elements Q1 to Q4 (see current time t=t16).

After the time t16, because the input voltage Vin is lower than the low potential threshold level Lth, the state signal Si whose level is forcibly fixed to the low level L for each of the switching elements Q1 to Q4 is output by the first and second units 18F1 and 18F2 to the switching controller 17. After the time t16, the first stop control signal ST1 is maintained at the low level by the third and fourth units 18F3 and 18F4, and the second stop control signal ST2 is maintained at the high level H by the fifth and sixth units F5 and F6. That is, after the time t16, the protection determination circuit 18A and the switching controller 17 perform the same operations as those before the time t12, so that the switching elements Q1 to Q4 are not driven.

After the time t16, when the input voltage Vin changes to be within the normal voltage range Vsp from outside thereof, and the input voltage Vin within the normal voltage range Vsp has been maintained for the time period Td, the protection determination circuit 18A and the switching controller 17 perform the same operations as those after the time t12. This results in the switching elements Q1 to Q4 being driven according to the corresponding amplified control signals PLS (see the time interval from the time t12 to the time t13).

FIG. 3 schematically illustrates a second control mode in which the protection determination circuit 18A and the switching controller 17 operate. The protection determination circuit 18A and the switching controller 17 operate in the second control mode when the input voltage Vin changes between the first state and the second state while the input voltage Vin varies, i.e. fluctuates, with short amplitudes and a short cycle positively and negatively with respect to the high potential threshold level Hth (see time interval between time t23 and time t24). Such pulsations are based on, for example, ripples and/or noise contained in the input voltage Vin due to, for example, external devices.

In FIG. 3, from time t21 to time t23, the protection determination circuit 18A and the switching controller 17 operate in the same manner as the first mode from the time t11 to the time t13. Specifically, up to time t22 corresponding to the time t12, the switching elements Q1 to Q4 are not driven, and from the time t22 to the time t23, the switching elements Q to Q4 are individually turned on and off according to the corresponding amplified control signals PLS.

During the time interval between the time t23 to the time t24, the input voltage Vin oscillates with a short cycle positively and negatively with respect to the high potential threshold level Hth, so that it repeatedly falls within and goes out of the normal voltage range Vsp.

Figure 4:
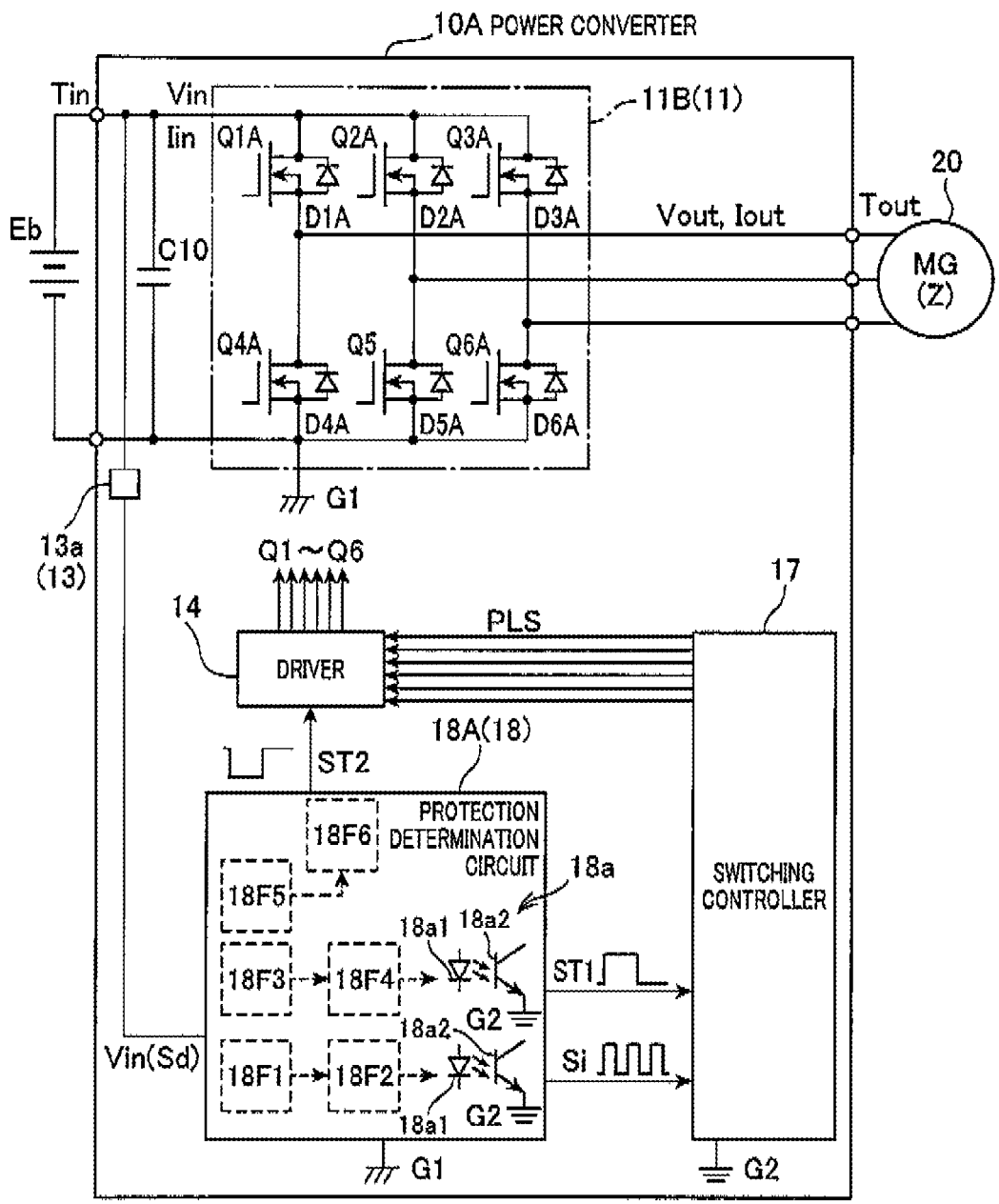
FIG. 4 is a circuit diagram schematically illustrating an example of the overall configuration of a power converter according to a second embodiment of the present disclosure.

FIG. 4 illustrates an example that, during the time interval between the time t23 to the time t24, the input voltage Vin is cyclically within the normal voltage range Vsp for a time period Tx shorter than the time period Td. Because the time period Tx during which the input voltage Vin is within the normal voltage range Vsp is shorter than the time period Td, the input voltage Vin within the normal voltage range Vsp has not been to maintained for the time period Td or longer. Thus, the second unit 18F2 does not output the state signals Si to the switching controller 17, so that no control signals PLS are output from the switching controller 17 to the driver 14. Similarly, the third unit 18F3 does not set the level of the first stop control signal ST1 to the high level H, and the fifth unit 18F5 does not set the level of the second stop control signal ST2 to the low level L. This results in the switching elements Q1 to Q4 being not driven for the time period Tx although the input voltage Vin is within the normal voltage range Vsp for the time period Tx.

That is, during the time interval from the time t23 to the time t24, the state signal Si whose level is forcibly fixed to the high level H is output by the first and second units 18F1 and 18F2 to the switching controller 17, the first stop control signal ST1 is maintained at the low level L, and the second stop control signal ST2 is maintained at the high level H. At the time t24, the input voltage Vin is within the normal voltage range Vsp. After the time t24, until the time period Td has elapsed since the time t24, the state signal Si is forcibly maintained at the high level H, the first stop control signal ST1 is maintained at the low level L, and the second stop control signal ST2 is maintained at the high level H (see the time interval from the time t24 to time t25).

After the time period Td has elapsed since the time t24 (see current time t=t25), the input voltage Vin is within the normal voltage range Vsp. At the current time t=t25, the first stop control signal ST1 is changed from the low level L to the high level H by the third and fourth units 18F3 and 18F4, and the second stop control signal ST2 is changed from the high level H to the low level L by the fifth and sixth units 18F5 and 18F6.

Thus, the state signal Si for each of the switching elements Q1 to Q4 is output by the first and second units 18F1 and 18F2 to the switching controller 17. In addition, the control signal PLS for each of the switching elements Q to Q4 that corresponds to the state signal Si for a corresponding one of the switching elements Q1 to Q4 is output from the switching controller 17 to the driver 14. Thus, because the second stop control signal ST2 is maintained at the low level L, amplified control signals PLS are output from the driver 14 to the control terminals of the respective switching elements Q1 to Q4 (see current time t≥t25). This results in the switching elements Q1 to Q4 being individually driven, i.e. turned on and off, according to the corresponding amplified control signals PLS. The state in which the control signals PLS are output from the switching controller 17 to the driver 14 is continued from the time t25 up to time t26 at which the input voltage Vin becomes out of the normal voltage range Vsp.

That is, at the time t26 (current time t=t26), the input voltage Vin falls below the low potential threshold level Lth so that it is out of the normal voltage range Vsp. For this reason, the state signal Si whose level is forcibly fixed to the low level L for each of the switching elements Q1 to Q4 is output by the first and second units 18F1 and 18F2 to the switching controller 17. At the time t26, the first stop control signal ST1 is changed from the high level H to the low level L by the third and fourth units 18F3 and 18F4, and the second stop control signal ST2 is changed from the low level L to the high level H by the fifth and sixth units 18F5 and 18F6.

Because the state signal Si is forcibly fixed to the low level L and the first stop control signal ST1 is maintained at the low level L, no control signals PLS are output from the switching controller 17 to the driver 14. In addition, the second stop control signal ST2 is maintained at the high level H. This results in no amplified control signals PLS being output from the driver 14 to the control terminals of the respective switching elements Q1 to Q4 (see current time t=t26).

After the time t26, because the input voltage Vin is lower than the low potential threshold level Lth, the constant low level signal for each of the switching elements Q1 to Q4 is output as the abnormal state signal Si(a) by the first and second units 18F1 and 18F2. After the time t26, the first stop control signal ST1 is maintained at the low level by the third and fourth units 18F3 and 18F4, and the second stop control signal ST2 is maintained at the high level H by the fifth and sixth units F5 and F6. That is, after the time t26, the protection determination circuit 18A and the switching controller 17 perform the same operations as those before the time t22, so that the switching elements Q1 to Q4 are not driven.

After the time t26, when the input voltage Vin has changed to be within the normal voltage range Vsp from outside thereof, and the input voltage Vin within the normal voltage range Vsp has been maintained for the time period Td, the protection determination circuit 18A and the switching controller 17 perform the same operations as those after the time t22. This results in the switching elements Q1 to Q4 being driven according to the corresponding amplified control signals PLS (see the time interval from the time t22 to the time t23).

As described above, the power converter 10 is configured such that the protection determination circuit 18A determines whether to protect the power converter 10 based on how the input voltage Vin measured by the voltage sensor 13a is input to the switch circuit 11A (see the first to fourth units 18F1 to 18F4).

Specifically, the protection determination circuit 18A is configured to transfer the second stop control signal ST2 with the low level L to the driver 14 based on the input voltage Vin, and determine, based on comparison between the input voltage Vin and the normal voltage range Vsp, whether to maintain the level of the second stop control signal ST2 at the low level L (see the fifth and sixth units 18F5 and 18F6).

That is, this configuration changes the level of the second stop control signal ST2 from the low level L to the high level H if the input voltage Vin is out of the normal voltage range Vsp. This forcibly disables the driver 14 from outputting, to the control terminal of each switching element Qi, the corresponding amplified control signal PLS without an aid of the switching controller 17. This disables drive of each switching element Qi without the need for the switching controller 17 to perform operations including, for example, recognition of change of the duty factor of a pulse signal. This configuration therefore disables output of the corresponding amplified control signal PLS from the driver 14 to the control terminal of each switching element Qi as immediately as possible with little influence from the performances of the switching controller 17.

More specifically, the protection determination circuit 18A transfers, to the switching controller 17, the state signal Si for each switching element Qi and the first stop control signal ST1 with the high level H based on the input voltage Vin, and determines, based on comparison between the input voltage Vin and the normal voltage range Vsp, whether to:

disable transfer of the state signal Si for each switching element to the switching controller 17; and maintain the level of the first stop control signal ST1 at the high level H.

That is, this configuration disables transfer of the state signal Si for each switching element Qi to the switching controller 17, and changes the level of the first stop control signal ST1 from the high level H to the low level L if the input voltage Vin is out of the normal voltage range Vsp. This disables drive of each switching element Qi, thus protecting the power converter 10 against the input voltage Vin being out of the normal voltage range Vsp.

This configuration makes it possible to immediately and reliably determine whether there is a need to protect the switch circuit 11A based on the input voltage Vin, thus immediately and reliably disabling drive of each switching element Qi upon determination that there is a need to protect the switch circuit 11A. This provides immediate stop of each switching element Qi in a case of an input of an overvoltage to the power converter 10, thus immediately protecting the power converter 10 without the need to use higher-voltage electrical components for the input- and output-side circuits of the power converter 10. This therefore results in reduction of the manufacturing cost and/or loss of the power converter 10. This also prevents the magnetic-flux density of the magnetic core of the transformer Tr from excessively increasing, thus eliminating a need of the magnetic core having a larger size for preventing magnetic saturation.

Particularly, this configuration changes the level of the first stop control signal ST1 from the high level H to the low level L if the input voltage Vin is out of the normal voltage range Vsp (see the third and fourth units 18P3 and 18F4). This forcibly disables the switching controller 17 from outputting, to the driver 14, the control signals PLS when the level of the first stop control signal ST1 changes from the high level H to the low level L. This disables drive of each switching element Qi without the need for the switching controller 17 to recognize change of the duty factor of a pulse signal. This configuration therefore disables output of the control signal PLS from the switching controller 17 to the driver 14 with little influence from the performances of the switching controller 17.

Particularly, the protection determination circuit 18A transfers, to the switching controller 17, a pulse signal as the state signal Si for each switching element Qi having a duty factor that individually changes depending on the input voltage Vin (see the first and second units 18F1 and 18F2). The protection determination circuit 18A also transfers, to the switching controller 17, a binary level signal as the first stop control signal ST1; the binary level signal has one of the high level H and the low level L according to whether the input voltage Vin is within or out of the normal voltage range Vsp (see the third and fourth units 18F3 and 18F4). This configuration therefore makes it possible for the switching controller 17 to easily determine whether to output the control signal PLS for each switching element Qi to the driver 14 without a need of higher performances of the switching controller 17.

In addition, the first and second units 18F1 and 18F2 of the protection determination circuit 18A are configured to output, to the switching controller 17, the state signal Si for each switching element Qi after the predetermined time period Td has elapsed since each time the input voltage Vin was entered within the normal voltage range Vsp from the outside thereof. The time period Td is required to determine whether the input voltage Vin is stable. Thus, this configuration makes it possible to output, to the switching controller 17, the state signal Si for each switching element Qi after the input voltage Vin stably lies within the normal voltage range Vsp.

That is, let us consider a case where the input voltage Vin varies, i.e. fluctuates, with short amplitudes, in a short cycle with respect to, for example, the high potential threshold level Hth while the input voltage Vin is cyclically within the normal voltage range Vsp for a time period Tx shorter than the time period Td.

In this case, if the first and second units 18F1 and 18F2 were configured to output, to the switching controller 17, the state signal Si for each switching element Qi each time the input voltage Vin is entered within the normal voltage range Vsp from the outside thereof, output of the state signal Si for each switching element Qi and output of the constant high level signal to the switching controller 17 might be repeated. This might result in chattering of each switching element Qi, in other words, result in repeated changes of each switching element Qi between the on state and the off state. This might cause reduction of the switching efficiency of the switch circuit 11A.

However, the configuration of the first and second units 18F1 and 18F2 according to the first embodiment would prevent output of the state signal Si for each switching element Qi and output of the constant high level signal to the switching controller 17 from being repeated as long as the time period Tx is shorter than the time period Td. This therefore results in prevention of the occurrence of chattering of each switching element Qi, thus preventing reduction of the switching efficiency of the switch circuit 11A.

As described in the first embodiment, the third and fourth units 18F3 and 18F4 can be configured to output, to the switching controller 17, the first stop control signal ST1 with the low level after the predetermined time period Td has elapsed since each time the input voltage Vin was entered within the normal voltage range Vsp from the outside thereof. Similarly, the fifth and sixth units 18F5 and 18F6 can be configured to output, to the driver 14, the second stop control signal ST2 with the high level after the predetermined time period Td has elapsed since each time the input voltage Vin was entered within the normal voltage range Vsp from the outside thereof. The configuration of the third and fourth units 18F3 and 18F4 and that of the fifth and sixth units 18F5 and 18F6 can achieve an effect identical to that achieved by the first and second units 18F1 and 18F2 set forth above.

The protection determination circuit 18A outputs the abnormal state signal Si(a) being maintained at the low level L if the input voltage Vin is lower than the normal voltage range Vsp (see the first and second units 18F1 and 18F2). This type of abnormality will be referred to as undervoltage abnormality. In addition, the protection determination circuit 18A outputs the abnormal state signal Si(a) being maintained at the high level H if the input voltage Vin is higher than the normal voltage range Vsp (see the first and second units 18F1 and 18F2). This type of abnormality will be referred to as overvoltage abnormality.

This configuration makes it possible for the switching controller 17 to easily determine whether there is overvoltage abnormality or undervoltage abnormality based on the level of the abnormal state signal Si(a).

In the power converter 10, the switch circuit 11A includes the transformer Tr1 comprised of the primary and secondary windings L1 and L2, and the protection determination circuit 18A is configured to use a voltage measured at an input side of the primary winding L1, i.e. an input side of the full-bridge configuration of the switching elements Q1 to Q4 as the input voltage Vin to the power converter 10 (see FIG. 1). This configuration reliably enables drive of each switching element QI when the input voltage Vin is within the normal voltage range Vsp, and reliably disables drive of each switching element Qi when the input voltage Vin is out of the normal voltage range Vsp with little influence from the performances of the switching controller 17.

In the power converter 10, the protection determination circuit 18A is comprised of the isolator elements 18a that electrically isolates input signals including the measurement signal Sd, i.e. the input voltage Vin, from output signals including the state signals Si, the abnormal state signals Si(a), the first stop control signal ST1, and the second stop control signal ST2. This makes it possible to eliminate the need to use higher-voltage electrical components as components of the switching controller 17 even if the input voltage Vin is a high DC voltage of, for example, 288 V or thereabout.

The power converter 10 is configured to determine whether the input voltage Vin is within or out of the normal voltage range Vsp, thus determining whether there is a need to protect the power converter 10 using the first stop control signal ST1, the second stop control signal ST2, and the level change of the state signal Si. This results in further improvement of the reliability of the power converter 10 against an abnormality in input power to the switch circuit 11A. This is because the power converter 10 is capable of determining that there is a need to protect the power converter 10 even if there is an error in two of the first stop control signal ST1, the second stop control signal ST2, and the state signal Si.

Second Embodiment

A power converter 10A according to a second embodiment of the present disclosure will be described hereinafter with reference to FIG. 4.

The structure and/or functions of the power converter 10A according to the second embodiment are different from those of the power converter 10 by the following points. So, the different points will be mainly described hereinafter, and therefore, redundant descriptions of like parts between the embodiments, to which like reference characters are assigned, are omitted or simplified.

The power converter 100A according to the second embodiment is comprised of a switch circuit 11B in place of the switch circuit 11A according to the first embodiment. The switch circuit 11B is operative to output a three-phase AC voltage as an example of periodic voltage signals with at least one of voltage and frequency varying with time. The three-phase AC voltage is supplied to a three-phase rotary electric machine 20 as an example of inductive loads in place of the load Z. That is, the power converter 10A serves as a three-phase inverter.

For example, the three-phase rotary electric machine 20 is provided with: an armature comprised of an inductive core and three-phase armature windings wound therearound; and a field member comprised of, for example, one or more magnets. When the armature is energized to generate a magnetic field, the generated magnetic field of the armature and a magnetic field generated by the field member cooperatively rotate any one of the armature and the field member relative to the other thereof to thereby create torque.

The power converter 10A has first, second, and third-phase output terminals Tout, such as, U-, V-, and W-phase output terminals Tout connected, via cables, to respective the three-phase armature windings, that is, U-, V-, and W-phase armature windings, of the three-phase rotary electric machine 20.

The switch circuit 11A is comprised of a first pair of series-connected switching elements Q1A and Q4A, a second pair of series-connected switching elements Q2A and Q5A, a third pair of series-connected switching elements Q3A and Q6A, and diodes D1A to D6A. For example, as the switching elements Q1A to Q6A, IGBTs or power MOSFETs can be respectively used.

Each of the switching elements Q1A to Q6A has a first terminal, a second terminal, and a conductive path formed therebetween. The first terminal of the switching element Q1A is connected to the positive input terminal Tin via the positive DC input line. The second terminal of the switching element Q1A is connected to the first terminal of the switching element Q4A to constitute the series-connected switching elements Q1A and Q4A. The second terminal of the switching element Q4A is connected to the negative input terminal I $T_{IN}$ via the negative DC input line.

Similarly, the first terminal of the switching element Q2A is connected to the positive input terminal Tin via the positive DC input line. The second terminal of the switching element Q2A is connected to the first terminal of the switching element Q5A to constitute the series-connected switching elements Q2A and Q5A. The second terminal of the switching element Q5A is connected to the negative input terminal Tin via the negative DC input line.

In addition, the first terminal of the switching element Q3A is connected to the positive input terminal Tin via the positive DC input line. The second terminal of the switching element Q3A is connected to the first terminal of the switching element Q6A to constitute the series-connected switching elements Q3A and Q6A. The second terminal of the switching element Q6A is connected to the negative input terminal Tin via the negative DC input line.

With the configuration, the switching elements Q1A to Q3A will also be referred to as high-side switching elements, and the switching elements Q4A to Q6A will also be referred to as low-side switching elements. That is, the high- and low-side switching elements connected in series to each other for each phase of the U-, V-, and W-phase armature windings constitute a half-bridge configuration.

Each of the diodes D1A to D6A is connected between the first end and second end of a corresponding one of the switching elements Q1A to Q6A in antiparallel thereto, and serves as a free-wheel diode.

If power MOSFETs are used as the switching elements Q1A to Q6A, intrinsic diodes of the power MOSFETs can be used as the flee-wheel diodes, thus eliminating the free-wheel diodes.

The series-connected switching elements Q1A and Q4A, the series-connected switching elements Q2A and Q5A, and the series-connected switching elements Q3A and Q6A are parallelly connected to each other.

Each of the switching elements Q1A to Q6A has a control terminal connected to the driver 14.

In the third embodiment, a connecting point between the series-connected switching elements Q1A and Q4A is connected to the first-phase output terminal Tout connected to the U-phase armature winding. A connecting point between the series-connected switching elements Q2A and Q5A is connected to the second-phase output terminal Tout connected to the V-phase armature winding. A connecting point between the series-connected switching elements Q3A and Q6A is connected to the third-phase output terminal Tout connected to the W-phase armature winding.

Specifically, the high- and low-side switching elements Q1A and Q4A correspond to the pair of switching elements Q1 and Q3 or the pair of switching elements Q2 and Q4. Similarly, the high- and low-side switching elements Q2A and Q5A correspond to the pair of switching elements Q1 and Q3 or the pair of switching elements Q2 and Q4. The high- and low-side switching elements Q3A and Q6A correspond to the pair of switching elements Q1 and Q3 or the pair of switching elements Q2 and Q4.

That is, one of the high-side switching elements Q1A to Q3A is sequentially turned on with dead times between the adjacent on durations while a corresponding same-phase low-side switching element is sequentially turned off. This causes the switch circuit 11A to serve as an inverter.

Other elements of the power converter 10A according to the second embodiment are substantially identical to those of the power converter 10 according to the first embodiment.

Specifically, the power converter 10A has a substantially identical configuration to that of the power converter 10 except that the switch circuit 11B and the load 20 are different from the switch circuit 11A and the load Z, respectively. Accordingly, the power converter 10A achieves substantially the same effects as those achieved by the power converter 10.

The first and second embodiments of the present disclosure and their modifications have been described, but the present disclosure is not limited thereto. Specifically, the first and second embodiments and their modifications can be freely changed within the scope of the present disclosure.

The switching controller 17 of the power converter 10 or 10A is configured to perform control of drive of each switching element Qi such that an actual value of the input voltage Vin used as the input/output parameter matches with a target value of the input voltage Vin, but the present disclosure is not limited thereto.

Figure 5:
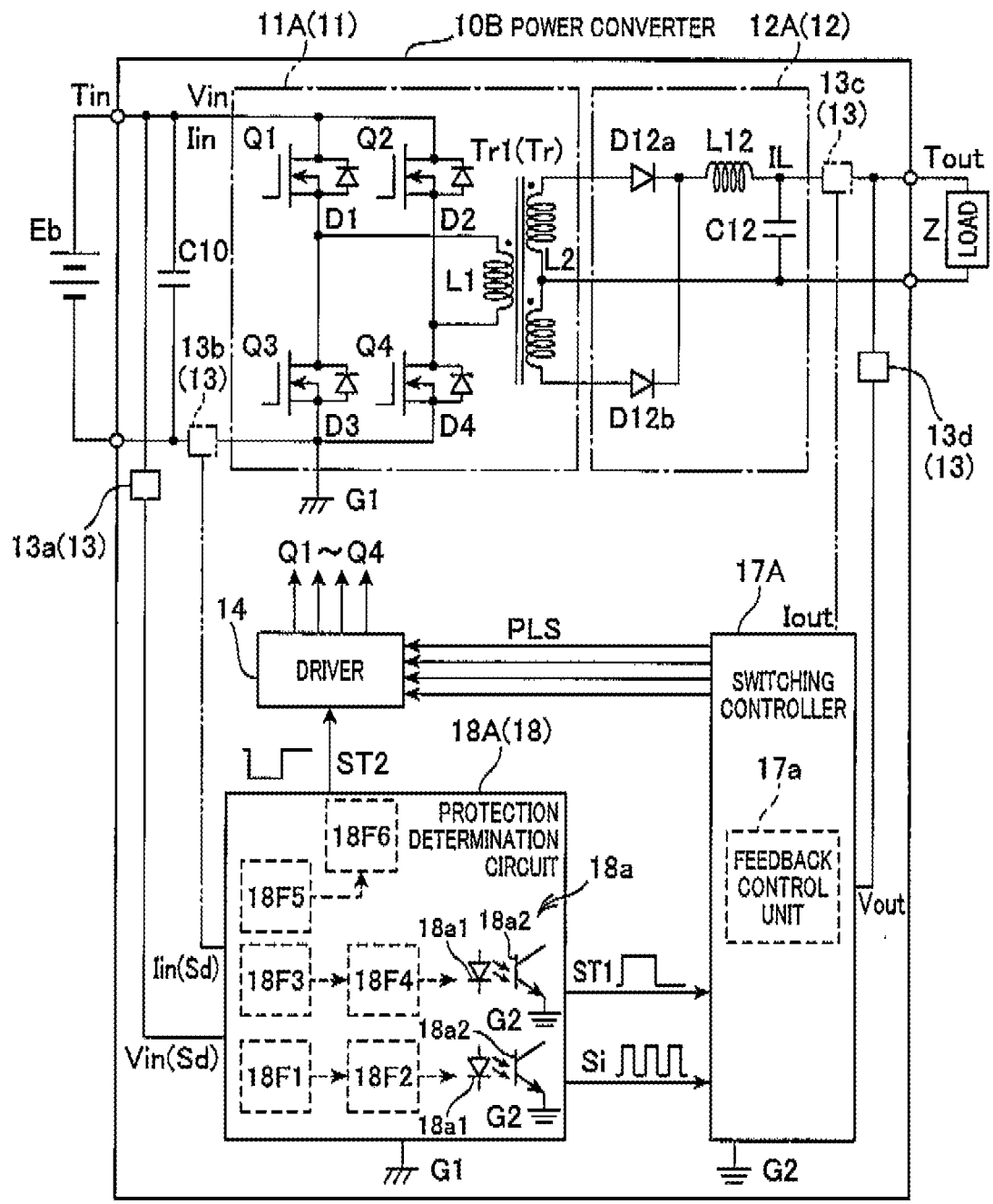
FIG. 5 is a circuit diagram schematically illustrating an example of the overall configuration of a power converter according to a first exemplary modification of the present disclosure.

Specifically, FIG. 5 schematically illustrates a power converter 10B according to a first exemplary modification of the present disclosure.

Referring to FIG. 5, the power converter 10B includes a switching controller 17A equipped with a feedback control unit 17a. The power converter 10B also includes a current sensor 13c (see reference character 13c and a two-dot chain line connected thereto illustrated in FIG. 5) and/or a voltage sensor 13d connected to the feedback control unit 17a of the switching controller 17A (see reference character 13d and a solid line connected thereto illustrated in FIG. 5).

The current sensor 13c is located, for example, between the coil L12 and the positive output terminal Tout. The current sensor 13c is operative to measure a value of a choke current IL, i.e. an output current from the switch circuit 11A, Iout flowing through the coil L12. The current sensor 13c is also operative to output, to the feedback control unit 17a, the measured value of the choke current IL. The voltage sensor 13d is connected to the other end of the coil L12, which is connected to the positive output terminal Tout of the power converter 10B. The voltage sensor 13d is operative to measure a value of the output voltage Vout, and output, to the feedback control unit 17a, the measured value of the output voltage Vout to the feedback control unit 17a.

The feedback control unit 17a is operative to perform feedback control of drive of each of the switching elements Q1 to Q4 such that the actually measured value of the input current Iout or the output voltage Vout matches with a target value of the input current Iout or the output voltage Vout.

Specifically, the feedback control unit 17a is operative to individually output the control signals PLS to the control terminals of the respective switching elements Q1 to Q4 based on the actually measured value of the input current Iout or the output voltage Vout such that the actually measured value of the input current Iout or the output voltage Vout matches with the target value thereof.

For example, for each predetermined switching cycle, the feedback control unit 17a is operative to perform:

calculation of a difference $\Delta$ between the measured value of the output voltage Vout and a target voltage value Vref; and calculation of a feedback controlled variable for, for example, the duty factor of the control signal PLS for each switching element Qi using the sum of a proportional gain term and an integral gain term of a PI feedback control algorithm (PI algorithm) using the difference $\Delta$ as its input.

In the PI algorithm, the feedback controlled variable is expressed based on the proportional gain term and the integral gain term.

The proportional gain term for the feedback controlled variable contributes to change in the feedback controlled variable in proportion to the difference $\Delta$. The integral gain term is proportional to an accumulated offset of instantaneous values of the difference $\Delta$ over time to reset the accumulated offset (steady-state deviation) over time to zero. Note that the feedback control unit 17a can calculate a feedback controlled variable Iref based on only one of a proportional gain term, an integral gain term, and a derivative gain term of a known P-, I-, or D-feedback control algorithm using the difference $\Delta$ as its input. The derivative term is proportional to a difference between a previous value of the difference $\Delta$ and a present value thereof to improve response of the feedback controlled variable to suppress fluctuations in the difference $\Delta$. The feedback control unit 17a also can calculate a feedback controlled variable based on the sum of a proportional gain term, an integral gain term, and a derivative gain term of a known PID feedback control algorithm (PID algorithm) using the difference $\Delta$ as its input.

After these feedback-control operations of the feedback control unit 17a, the switching controller 17A outputs, to the driver 14, the control signal PLS for each switching element Qi having the corresponding duty factor obtained as the feedback controlled variable by the feedback control unit 17a. This makes it possible for the driver 14 to control each of the switching elements Q1 to Q4 based on the duty factor of the control signal PLS for a corresponding one of the switching elements Q1 to Q4 sent from the feedback controller 17A.

In the power converter 10B according to the first exemplary modification, the protection determination circuit 18A is configured to determine, based on comparison between the input voltage Vin and the normal voltage range Vsp, whether to:

disable transfer of the state signal Si for each switching element to the switching controller 17A;

maintain the level of the first stop control signal ST1 at the high level H; and maintain the level of the second stop control signal ST2 at the low level L.

That is, this configuration disables transfer of the state signal Si for each switching element Qi to the switching controller 17A, changes the level of the first stop control signal ST1 from the high level H to the low level L, and changes the level of the second stop control signal ST2 from the low level L to the high level H if the input voltage Vin is out of the normal voltage range Vsp.

This configuration makes it possible for the switching controller 17A to disable output of the control signal PLS for each switching element Qi and for the driver 14 to disable output of the amplified control signal PLS to the control terminal of each switching element Qi if the input voltage Vin is out of the normal voltage range Vsp.

Accordingly, the power converter 10B achieves substantially the same effects as those achieved by each of the power converters 10 and 10A.

Each of the power converters 10, 10A, and 10B is comprised of the voltage sensor 13a that measures the input voltage Vin input to the switch circuit 11A as an input signal thereto, but the present disclosure is not limited thereto.

Specifically, as illustrated in, for example, FIG. 5, each of the power converters 10, 10A, and 10B can be comprised of a current sensor 13b in place of or in addition to the voltage sensor 13a. The current sensor 13b is an example of measuring units, and is located on, for example, the negative DC input line between the positive input terminal Tin and the second terminal of the switching element Q3 (see reference character 13b and a two-dot chain line connected thereto illustrated in FIG. 5). The current sensor 13b is operative to measure the input current Iin input to the switch circuit 11A as an input signal thereto.

In this modification, the first unit 18F1 can generate, based on a measurement signal Sd as the input current Iin, sent from the current sensor 13b, the state signals Si. The third unit 18F3 can determine, based on the measurement signal Sd, i.e. the input current Iin, sent from the current sensor 13b, whether to set the level of the first stop control signal ST1 to one of the high level H and the low level L. The fifth unit 18F5 can determine, based on the measurement signal Sd, i.e. the input current Iin, sent from the current sensor 13b, whether to set the level of the second stop control signal ST2 for the switching element Q1 to Q4 to one of the high level H and the low level L.

Each of the power converters 10 and 10B according to the first and first exemplary modification is designed as a full-bridge switching power supply (see FIGS. 1 and 5), but the present invention is not limited thereto.

Figure 6:
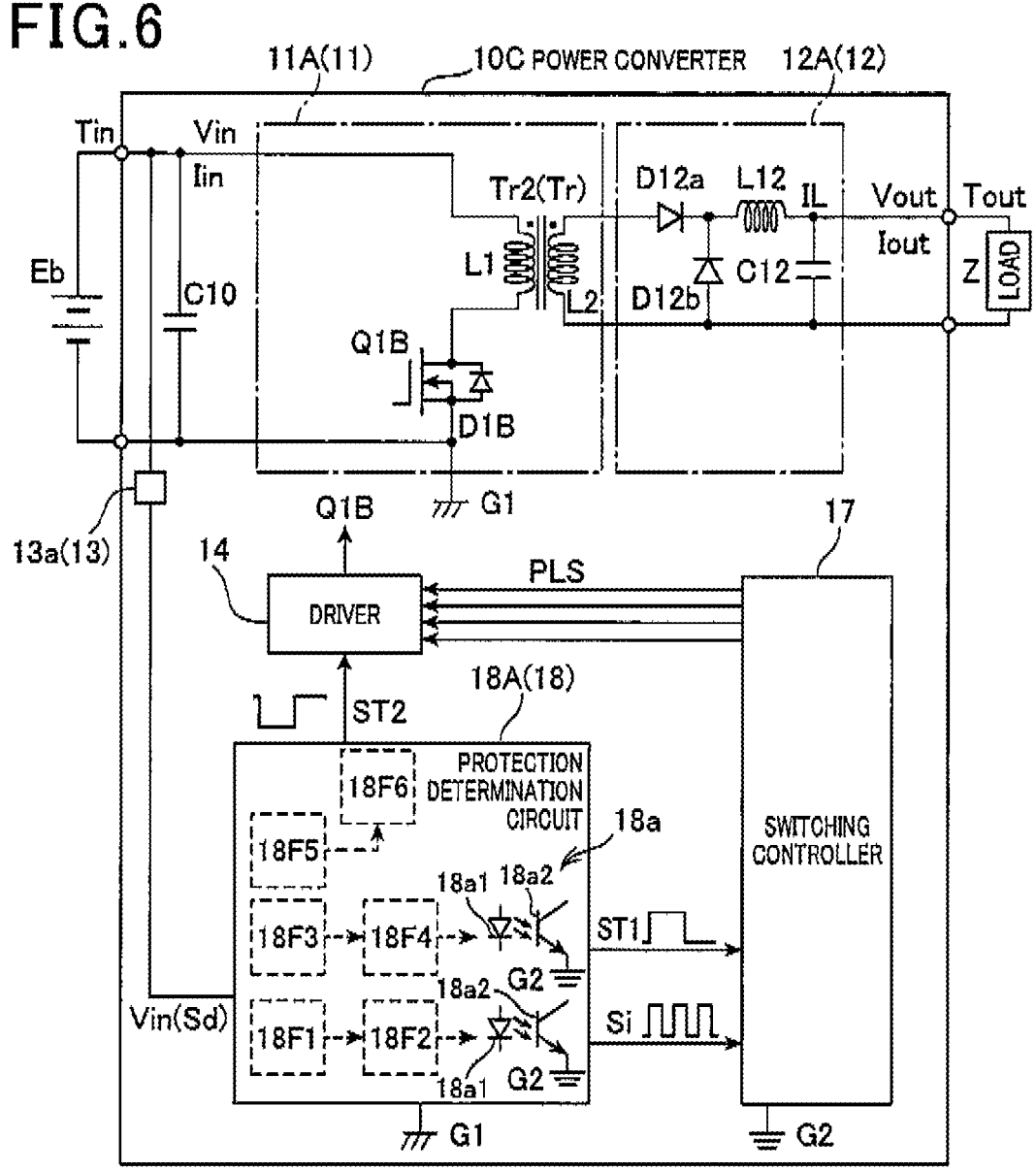
FIG. 6 is a circuit diagram schematically illustrating an example of the overall configuration of a power converter according to a second exemplary modification of the present disclosure.

Specifically, FIG. 6 schematically illustrates a power converter 10C according to a second exemplary modification of the present disclosure.

Referring to FIG. 6, the power converter 10C is designed as a feedforward switching power supply including a switch circuit 11C.

As illustrated in FIG. 6, the switch circuit 11C is comprised of a transformer Tr2 including a primary winding L1 and a secondary winding L2 magnetically coupled to the primary winding L1. The switch circuit 11C is also comprised of a switching element Q1B having a first terminal, a second terminal, and a conductive path formed therebetween.

The primary winding L1 has one end connected to the positive input terminal Tin via the positive DC input line. The secondary winding L2 has a first end and a second end opposite thereto. The first end of the secondary winding L2 is connected to the anode of the first diode 12a, and the second end thereof is connected to the negative output terminal Tout. The second diode 12b is connected in parallel to the secondary winding L2. The cathode of the first diode 12a and the cathode of the second diode 12b are commonly connected to one end of the coil L12. The other end of the coil L12 is connected to the positive output terminal Tout. The capacitor C12 is connected between the coil L12 and the load Z to be in parallel to the load Z.

The first terminal of the switching element Q1B is connected to the other end of the primary winding L1, and second terminal of the switching element Q1B is connected to the negative input terminal Tin via the negative DC input line. The switching element Q1B has a control terminal connected to the driver 14. As described above, an amplified control signal PLS sent from the driver 14 and input to the control terminal of the switching element Q1B opens or closes the conductive path thereof, that is, turns on or off the switching element Q1B.

Specifically, turn-on and turn-off operations of the switching element Q1B by the driver 14 convert the DC voltage input to the switch circuit 11C into an AC voltage in the same manner as the first embodiment. The AC voltage is input to the rectifying and smoothing circuit 12, and the rectifying and smoothing circuit 12 rectifies and smoothes the AC voltage, thus generating a DC voltage different from the input DC voltage.

In the power converter 10C according to the second exemplary modification, the protection determination circuit 18A is configured to determine, based on comparison between the input voltage Vin and the normal voltage range Vsp, whether to:

disable transfer of the state signal Si for the switching element Q1B to the switching controller 17;

maintain the level of the first stop control signal ST1 at the high level H; and maintain the level of the second stop control signal ST2 at the low level L.

That is, this configuration disables transfer of the state signal Si for the switching element Q1B to the switching controller 17, changes the level of the first stop control signal ST1 from the high level H to the low level L, and changes the level of the second stop control signal ST2 from the low level L to the high level H if the input voltage Vin is out of the normal voltage range Vsp.

This configuration makes it possible for the switching controller 17 to disable output of the control signal PLS for the switching element Q1B and for the driver 14 to disable output of the amplified control signal PLS to the control terminal of the switching element Q1B if the input voltage Vin is out of the normal voltage range Vsp.

Accordingly, the power converter 10C achieves substantially the same effects as those achieved by each of the power converters 10 and 10A.

The power converter according to each of the first and second embodiments and their modifications uses, as the state signal Si for each switching element Qi, a pulse signal having a constant frequency and a variable duty factor that varies depending on the input voltage Vin (see FIGS. 2 and 3). That is, the power converter according to each of the first and second embodiments and their modifications controls the pulse signal as the state signal Si for each switching element Qi in a PWM (Pulse Width Modulation) mode. However, the present disclosure is not limited thereto. Specifically, a power converter according to a third exemplary modification of the present disclosure uses, as the state signal Si for each switching element Qi, a pulse signal having a constant duty factor with a variable frequency that varies depending on the input voltage Vin. That is, the power converter according to the third exemplary modification controls the pulse signal as the state signal Si for each switching element Qi in a PFM (Pulse Frequency Modulation) mode.

The power converter according to each of the first and second embodiments and their modifications is different from that according to the third exemplary modification in how to modulate the pulse signal used as the state signal Si for each switching element Qi. Thus, the power converter according to the third exemplary modification achieves substantially the same effects as those achieved by the power converter according to each of the first and second embodiments.

The switch circuit 11A designed as a full-bridge circuit is applied to the power converter 10 according to the first embodiment (see FIG. 1), and the switch circuit 11B designed as a half-bridge circuit is applied to the power converter 10A according to the first embodiment (see FIG. 4). However, another type of switch circuits including switching elements Q1 to Qn (n is an integer equal to or more than 2) can be applied to each of the power converters 10 and 10A.

For example, if such another type of switch circuits includes a transformer Tr, a push-pull circuit or a flyback circuit can be applied to each of the power converters 10 and 10A as a switch circuit. If such another type of switch circuits includes a magnetic component except for a transformer Tr, a switch circuit 11C illustrated in FIG. 7 can be applied to each of the power converters 10 and 10A as a switch circuit.

Figure 7:
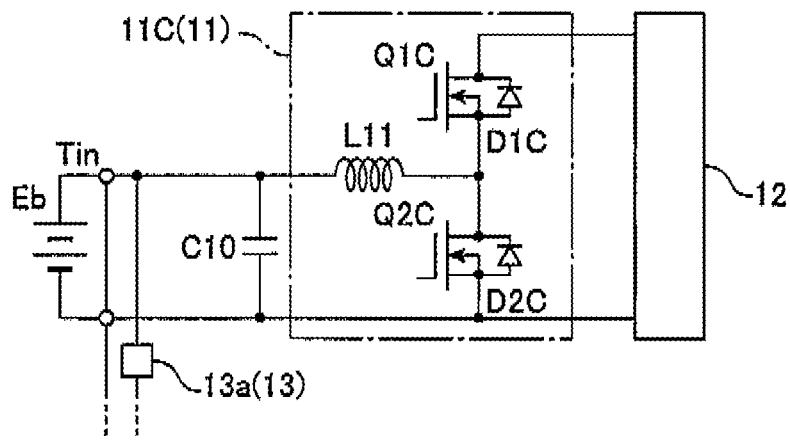
FIG. 7 is a circuit diagram schematically illustrating an example of a switch circuit including a magnetic component except for a transformer; the switch circuit can be applied to the power converter according to each of the first and second embodiments.

Referring to FIG. 7, the switch circuit 11C is comprised of series-connected switching elements Q1C and Q2C, diodes D1C and D2C, and a coil L11. For example, as the switching elements Q1C and Q2C, IGBTs or power MOSFETs can be respectively used.

Each of the switching elements Q1C and Q2C has a first terminal, a second terminal, and a conductive path formed therebetween. The first terminal of the switching element Q1C is connected to the positive input terminal of the rectifying and smoothing circuit 12. The second terminal of the switching element Q2C is connected to the negative terminal of the DC power source Eb via the negative input terminal Tin and the negative DC input line. The second terminal of the switching element Q2C is also connected to the negative input terminal of the rectifying and smoothing circuit 12. The second terminal of the switching element Q1C is connected to the first terminal of the switching element Q2C to constitute the series-connected switching elements Q1C and Q2C. A connecting point between the second end of the switching element Q1C and the first end of the switching element Q2C is connected to one end of the coil L1. The other end of the coil L11 is connected to the positive terminal of the DC power source Eb via the positive input terminal Tin and the positive DC input line. Each of the switching elements Q1C and Q2C has a control terminal connected to the driver 14 (not shown in FIG. 7). Each of the diodes D1C and D2C is connected between the first end and second end of a corresponding one of the switching elements Q1C and Q2C in antiparallel thereto, and serves as a free-wheel diode.

A terminal voltage of the DC power source Eb is smoothed by the capacitor C10 and the coil L11, which constitute a smoothing circuit, and the smoothed voltage is input to the switching elements Q1C and Q2C of the switch circuit 11C as an input voltage Vn. The input voltage Vin is controlled by turn-on and turn-off of the respective switching elements Q1C and Q2c, so that an AC voltage is input to the rectifying and smoothing circuit 12.

Even if each of the power converters 10 and 10A is comprised of another type of switch circuits, such as the switch circuit 11C illustrated in FIG. 7, it is possible for each of the power converters 10 and 10A to achieve substantially the same effects as those achieved by a corresponding one of the power converters 10 and 10A.

Note that, in the disclosure, an expression "at least one of A and B" includes at least one of A or B.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converter comprising:
   a driver that drives, according to a control signal, a switching element of a switch circuit for converting input power to output power, the control signal representing how to drive the switching element;
   a controller that outputs the control signal to the driver for controlling the driver;
   a measuring unit that measures a value of the input power input to the switch circuit; and
   a protection determining unit that:
      determines, based on the measured value of the input power, whether there is a need to protect the power converter; and
      outputs a stop control signal to at least one of the driver and the controller based on a result of the determination of whether there is a need to protect the power converter, the stop control signal representing whether to forcibly stop drive of the switching element;
   wherein the protection determining unit is configured to output, as the stop control signal, at least one of: a first stop control signal to the controller; and a second stop control signal to the driver based on a result of the determination of whether there is a need to protect the power converter.

2. The power converter according to claim 1, wherein the protection determining unit:
   determines whether there is a need to protect the power converter based on a comparison between the measured value of the input power and a normal input-power range for the switch circuit; and
   determines that there is a need to protect the power converter when the measured value of the input power is out of the normal input-power range.

3. The power converter according to claim 2, wherein:
   the protection determining unit is configured to:
   output, as the stop control signal, a first stop signal with a first level to the controller and a second stop control signal with a second level to the driver upon determination that there is a need to protect the power converter because of the measured value of the input power being out of the normal input-power range, the first level being different from the second level.

4. A power converter comprising:
   a driver that drives, according to a control signal, a switching element of a switch circuit for converting input power to output power, the control signal representing how to drive the switching element;
a controller that outputs the control signal to the driver for controlling the driver;
a measuring unit that measures a value of the input power input to the switch circuit; and
a protection determining unit that:
determines, based on the measured value of the input power, whether there is a need to protect the power converter; and
outputs a stop control signal to at least one of the driver and the controller based on a result of the determination of whether there is a need to protect the power converter, the stop control signal representing whether to forcibly stop drive of the switching element;
wherein:
when the stop control signal is output from the protection determining unit to the driver, the driver stops drive of the switching element, and
when the stop control signal is output from the protection determining unit to the controller, the controller stops output of the control signal to the driver.

5. The power converter according to claim 1, further comprising:
an input-state measuring unit that measures how the input power is input to the switch circuit, and outputs, to the controller, a state signal indicative of how the input power is input to the switching unit.

6. The power converter according to claim 5, wherein the input-state measuring unit is configured to forcibly fix the state signal to a predetermined constant level for instructing the controller to forcibly stop drive of the switching element when it is determined that there is a need to protect the power converter.

7. The power converter according to claim 5, wherein:
the protection determining unit is configured to:
determine whether the measured value of the input power is within or out of a normal input-power range for the switch circuit as determination of whether there is a need to protect the power converter; and
output, as the stop control signal, a first stop control signal having one of a first level and a second level different thereto to the controller and a second stop control signal having one of the first level and the second level to the driver based on whether the measured value of the input power is within or out of the normal input-power range; and
the input-state measuring unit is configured to output, as the state signal to the controller, a pulse signal having a variable duty factor.

8. The power converter according to claim 7, wherein:
the protection determining unit is configured to output the first stop signal with the first level to the controller and the second stop control signal with the second level to the driver upon determination that the measured value of the input power is out of the normal input-power range; and
the input-state measuring unit is configured to output, to the controller, the pulse signal whose level is fixed to one of the first level and the second level upon determination that the measured value of the input power is out of the normal input-power range.

9. The power converter according to claim 8, wherein:
the protection determining unit is configured to output the first stop signal with the second level to the controller and the second stop control signal with the first level to the driver upon determination that a preset time period has elapsed since the measured value of the input power was within the normal input-power range; and
the input-state measuring unit is configured to cancel fixation of the level of the pulse signal to one of the first level and the second level upon determination that the preset time period has elapsed since the measured value of the input power was within the normal input-power range.

10. The power converter according to claim 8, wherein:
the input-state measuring unit is configured to:
output, to the controller, the pulse signal whose level is fixed to a low level as the first level upon determination that the measured value of the input power is lower than the normal input-power range; and
output, to the controller, the pulse signal whose level is fixed to a high level as the second level upon determination that the measured value of the input power is higher than the normal input-power range.

11. The power converter according to claim 1, wherein:
the switch circuit includes a transformer comprised of a primary winding and a secondary winding magnetically coupled thereto; and
the measuring unit is configured to measure, as the value of the input power, a value of power applied to the primary winding of the transformer.

12. A power converter comprising:
a driver that drives, according to a control signal, a switching element of a switch circuit for converting input power to output power, the control signal representing how to drive the switching element;
a controller that outputs the control signal to the driver for controlling the driver;
a measuring unit that measures a value of the input power input to the switch circuit; and
a protection determining unit that:
determines, based on the measured value of the input power, whether there is a need to protect the power converter; and
outputs a stop control signal to at least one of the driver and the controller based on a result of the determination of whether there is a need to protect the power converter, the stop control signal representing whether to forcibly stop drive of the switching element, wherein:
the switch circuit includes a transformer comprised of a primary winding and a secondary winding magnetically coupled thereto;
the measuring unit is configured to measure, as the value of the input power, a value of power applied to the primary winding of the transformer; and
the protection determining unit comprises an isolated element that electrically isolates the input power from the stop control signal.

* * * * *